United States Patent
Allen et al.

(10) Patent No.: US 9,928,229 B2
(45) Date of Patent: *Mar. 27, 2018

(54) UTILIZING INFORMATION ASSOCIATED WITH AN ACTION COMMAND TO SELECT AN APPROPRIATE FORM

(71) Applicant: INTERNATIONAL BUSINESS MACHINES CORPORATION, Armonk, NY (US)

(72) Inventors: Corville O. Allen, Cary, NC (US); Andrew R. Freed, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,096

(22) Filed: Mar. 24, 2016

(65) Prior Publication Data

US 2017/0052940 A1  Feb. 23, 2017

Related U.S. Application Data

(63) Continuation of application No. 14/831,536, filed on Aug. 20, 2015.

(51) Int. Cl.
G06F 17/00 (2006.01)
G06F 17/24 (2006.01)
G06F 17/27 (2006.01)

(52) U.S. Cl.
CPC ........ G06F 17/243 (2013.01); G06F 17/2785 (2013.01)

(58) Field of Classification Search
None
See application file for complete search history.

(56) References Cited

U.S. PATENT DOCUMENTS 6,778,979 B2  8/2004  Grefenstette et al.
7,426,496 B2  9/2008  Kristjansson
(Continued)

FOREIGN PATENT DOCUMENTS

WO  2008098900  8/2008

OTHER PUBLICATIONS

Jeffrey Dalton et al., "A Neighborhood Relevance Model for Entity Linking", OAIR '13 Proceedings of the 10th Conference on Open Research Areas in Information , May 2013.

*Primary Examiner* — Howard Cortes
(74) *Attorney, Agent, or Firm* — Michael R. Long; Diana L. Roberts

(57) ABSTRACT

A technique for pre-filling a computing device form with information associated with an action command found in a message includes receiving a message. Content of the message is analyzed utilizing natural language processing (NLP) to locate an action command within the message. NLP is applied to text in the message that is associated with the action command to determine a context of the action command. A similarity algorithm is applied to the text and one or more input fields of the form to identify one or more matching elements between the text and the input fields of the form. Finally, the input fields of the form are automatically pre-filled with information associated with the matching elements in the message whose similarity exceeds a predetermined threshold.

6 Claims, 6 Drawing Sheets

(56) References Cited

U.S. PATENT DOCUMENTS

| | | | |
|---|---|---|---|
| 8,594,996 B2 | 11/2013 | Liang et al. | |
| 8,595,230 B1 | 11/2013 | Djabarov | |
| 2006/0197982 A1* | 9/2006 | Bell | G06F 17/243 |
| | | | 358/1.18 |
| 2011/0106892 A1* | 5/2011 | Nelson | G06Q 10/109 |
| | | | 709/206 |
| 2014/0101260 A1* | 4/2014 | Langen | G06Q 10/06 |
| | | | 709/206 |
| 2014/0288973 A1 | 9/2014 | Carus et al. | |
| 2015/0095753 A1* | 4/2015 | Gajera | G06F 17/248 |
| | | | 715/226 |
| 2016/0048500 A1* | 2/2016 | Hebert | G06F 17/243 |
| | | | 704/9 |

* cited by examiner

UTILIZING INFORMATION ASSOCIATED WITH AN ACTION COMMAND TO SELECT AN APPROPRIATE FORM

BACKGROUND

The present disclosure is generally directed to techniques for utilizing information associated with an action command in a message and, more particularly, to utilizing information associated with an action command in a message to select an appropriate form and populate one or more input fields of the form.

Watson is a question answering (QA) system (i.e., a data processing system) that applies advanced natural language processing (NLP), information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

The World Wide Web includes billions of linked electronic documents. Each of the documents has a unique identifier known as uniform resource locators (URL) that serves as an address for the document. When a first electronic document is related to a second electronic document, it may be helpful to link the first document to the second document. One common way to link a first document to a second document is to add a hyperlink for the second document in the first document. The hyperlink allows a reader of the first document (or other user of the first document, such as a web crawler or a computer system) to obtain access to the second document by selecting a section of the first document that includes the hyperlink.

As a content developer adds text to a source document (e.g., a webpage or other hypertext page or other electronic document), the developer may wish to include one or more links that associate the text with one more target documents (e.g., other webpages that have related content). In particular, adding a hyperlink to a document may be desirable in situations where the text includes a suggestion that a reader of the text (e.g., target audience, intended human user) complete some particular action. By linking the text to a target document that is preconfigured to allow completion of the particular action by the reader, the usefulness of the source document and the target document may both be increased. In some situations, however, a content developer may not have the time or desire to manually locate appropriate target documents. Moreover, a content developer may add links to improper or inadequate target documents. As a result, a source document may be missing key links that would increase its usability.

BRIEF SUMMARY

Disclosed are a method, a data processing system, and a computer program product (embodied in a computer-readable storage device) for utilizing information associated with an action command in a message to select an appropriate form and populate one or more input fields of the form.

A technique for pre-filling a computing device form with information associated with an action command found in a message includes receiving a message. Content of the message is analyzed utilizing natural language processing (NLP) to locate an action command within the message. NLP is applied to text in the message that is associated with the action command to determine a context of the action command. A similarity algorithm is applied to the text and one or more input fields of a form to identify one or more matching elements between the text and the input fields of the form. Finally, the input fields of the form are automatically pre-filled with information associated with the matching elements in the message whose similarity exceeds a predetermined threshold.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
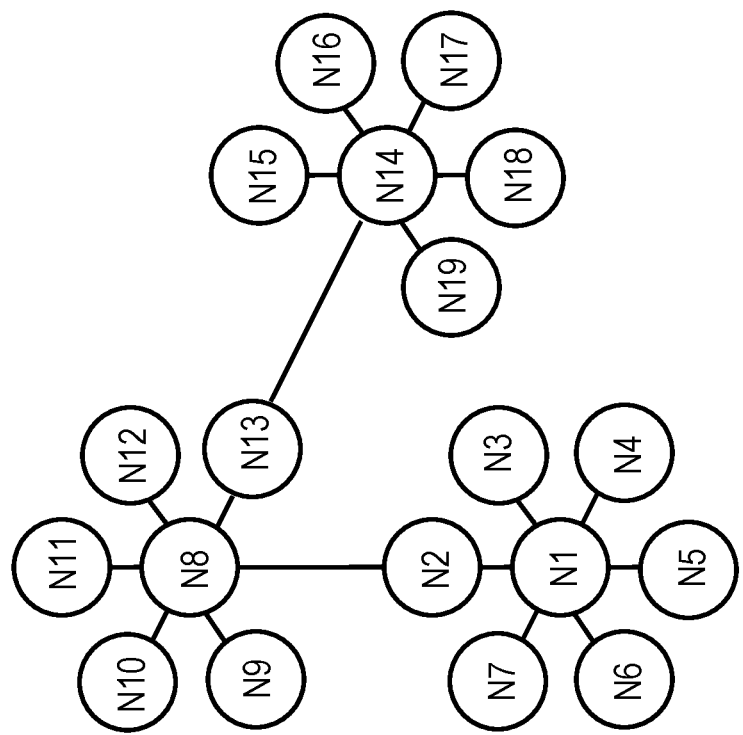
FIG. 1 is a diagram of an exemplary high performance computing (HPC) cluster that includes a number of nodes, with one or more of the nodes including multiple processors that are configured to function as a question answering (QA) system, according to various aspects of the present disclosure.

The illustrative embodiments provide a method, a data processing system, and a computer program product (embodied in a computer-readable storage device) for utilizing information associated with an action command in a message to select an appropriate form and populate one or more input fields of the form.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable.

Missing links in a source document may be identified by locating an instruction (action command) in a source document, locating a relevant target document that is preconfigured to allow the action command to be completed, and then linking the source document to the target document. Natural language processing (NLP) may be used to analyze a source document and one or more target documents in order to identity an action command to be completed and a context of all of the documents. For example, contexts of source and target documents may be compared in order to determine whether the documents are related and which target document is the best target document (when multiple target documents are identified). For example, source code of a target document may be analyzed in order to determine whether the target document is capable of performing an identified action command and is the best target document.

A source document may be parsed and NLP techniques may be used to identify entities, phrases, and action command statements (action commands) in the source document that may be related to external sources or references (e.g., candidate target documents). Candidate target documents may then be analyzed and entity resolution and context analysis may be used to determine which of the candidate target documents is most relevant to a particular action command identified in the source document. As one example, only the most significant entities within a source document may be used in identifying and evaluating candidate target documents. In general, employing only the most significant entities may allow for more targeted and accurate identifications of acceptable target documents.

A source document may be a webpage, an email message, a word processor document, or other electronic document. Entity detection may be performed on the source document in order to identify the significant entities (e.g., text elements) in passages of the source document. For each entity, the context of the entity may be determined using NLP. A link to a target document may be chosen for an entity after analyzing a set of candidate target documents that match the context of the entity and are able to complete an action command indicated by the entity. When one or more candidate target documents are located (by search application or otherwise) in a data source and are deemed to match a parsed text element from a source document, a target document evaluator may be configured to analyze and evaluate the candidate target documents. The analysis may include determining which, if any, of the candidate target documents incorporate content preconfigured to allow (e.g., a reader) to complete an action command indicated in the source document.

A target document evaluator may use a variety of techniques including, for example, NLP and source code analysis in order to perform a thorough analysis of candidate target documents. In general, NLP of candidate target documents is performed in addition to NLP of source documents to facilitate more precise and accurate matching of source and target documents. A source document may be an electronic document that is submitted by a user or automatically identified and submitted by a computer module for evaluation. Based on NLP results, a determination may be made as to whether passages of a source document indicate that there is any action to be undertaken by a reader (e.g., an intended human recipient) of the source document or by any other potential user (e.g., a specific type of application or a web crawler). In making the determination as to whether an action is to be undertaken, a system may rely on various factors including, for example, whether a source document incorporates one or more verbs in the imperative mood and whether the source document includes one or more words that are indicative of user action (e.g., submit, provide, supply, or furnish). Example action types that are identified may include, for example, a reader input field fill-in action type.

When identifying a context of an identified action command, the results of the NLP of the content may be utilized. For example, as part of NLP of a text passage, the passage may be parsed and entity resolution techniques may be employed to help identify important entities within the passage. Once entities have been identified, correlations and linguistic links between entities may be detected and used to establish relevance of the entities and, ultimately, the context of the passage. As one example, inverse document frequency techniques may be useful in determining the relative importance of a given entity to the context of the passage. Inverse document frequency utilizes the relative commonality of the entity as an indicator of its importance to evaluating context. A search may then be undertaken for candidate target documents that may be linked to the source document.

For example, a search may be a preliminary search intended to obtain several candidate target documents that can then be further limited to a smaller group of documents by more individualized analysis. The search may incorporate static keyword searching of the Internet using keywords (e.g., relatively important entities) obtained from the source document and may utilize one or more third-party search engines. A candidate target document obtained from the search may be analyzed using source code analysis, which may include parsing hyper text markup language (HTML) of a candidate target document. Based on the analysis, a determination may be made as to whether a candidate target document is preconfigured to support completion of the action command type identified. For example, if the action command type is a reader fill-in input field action type then the candidate target document may be deemed preconfigured to support the action command if it includes source code that defines a form.

Other evidence may also be uncovered in the analysis of the target document source code. If a determination is made that the candidate target document is not preconfigured to support the identified action type, then the candidate target document may be discarded. If, however, a determination is made that the candidate target document is preconfigured (or is likely preconfigured) to support the identified action type, then NLP of the candidate target document may be undertaken. NLP of a candidate target document may occur subsequent to determining a candidate target document is preconfigured to support an identified action type to help preserve computing resources (i.e., by ensuring that the only candidate target documents that undergo NLP are those documents that are capable of being relevant). Alternatively, NLP of a candidate target document may be initiated prior to the preconfiguration determination and the results of the NLP may be used instead of or in addition to the source code analysis. For example, the discovery of certain words in the source document (e.g., submit) or their semantic equivalents may be helpful in determining if a candidate target document is preconfigured to allow completion of an identified action type.

Based on the results of the NLP of a candidate target document, a context of the candidate target document may be determined. For example, a context of an identified action (as derived from a source document) may be compared with a context of a candidate target document. A determination is then made as to whether the two documents have matching contexts. For example, the contexts may be deemed to match if they are substantially similar or achieve a threshold level of similarity. Determining whether contexts match may involve scoring factors that weigh in favor of similarity (e.g., containing semantically similar entities, similar time periods referenced, similar phraseology used, etc.) and then combining intermediate scores to provide a final score. If a determination is made that source and candidate target documents contexts do not match (e.g., the threshold is not achieved), then a candidate target document may be discarded. If, however, it is determined that contexts match, then the candidate target document may be included in a final candidate pool for further evaluation.

A determination may then be made as to whether there are any remaining candidate target documents (e.g., uncovered in a search) that still need to be analyzed. For each such candidate target document, the operations discussed above may be completed, as applicable. Once all of the discovered candidate target documents have been analyzed, the candidate target documents in the final candidate pool may be ranked against each other. The rankings may consider how likely each document is to be the correct target document (e.g., how likely the document is preconfigured to allow a reader to complete the identified action for the greatest number of input fields). The highest ranking candidate target document may then be selected and a hyperlink may be added to the source document (or otherwise provided to a user) in order to provide a link to the selected candidate target document.

According to one or more embodiments of the present disclosure, a hyperlink that links to a target document (e.g., a form) may be presented to a user when the user is viewing a source document (e.g., an email message). In this case, when the user selects the hyperlink the target form may be pre-filled with values provided in text passages of the source document. According to at least one embodiment of the present disclosure, evidence (as to why a text passage of a source document is linked to an input field of the target form) in the source document is indicated, e.g., by highlighting the text passage in the source document.

Conventionally, the Watson system has explored large amounts of structured and unstructured data to find candidate answers for a question (or a problem). According to various aspects of the present disclosure, techniques for performing high performance computing (HPC), or network computing, are described herein that facilitate utilizing information associated with an action command in a message to select an appropriate form and populate one or more input fields of the form. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
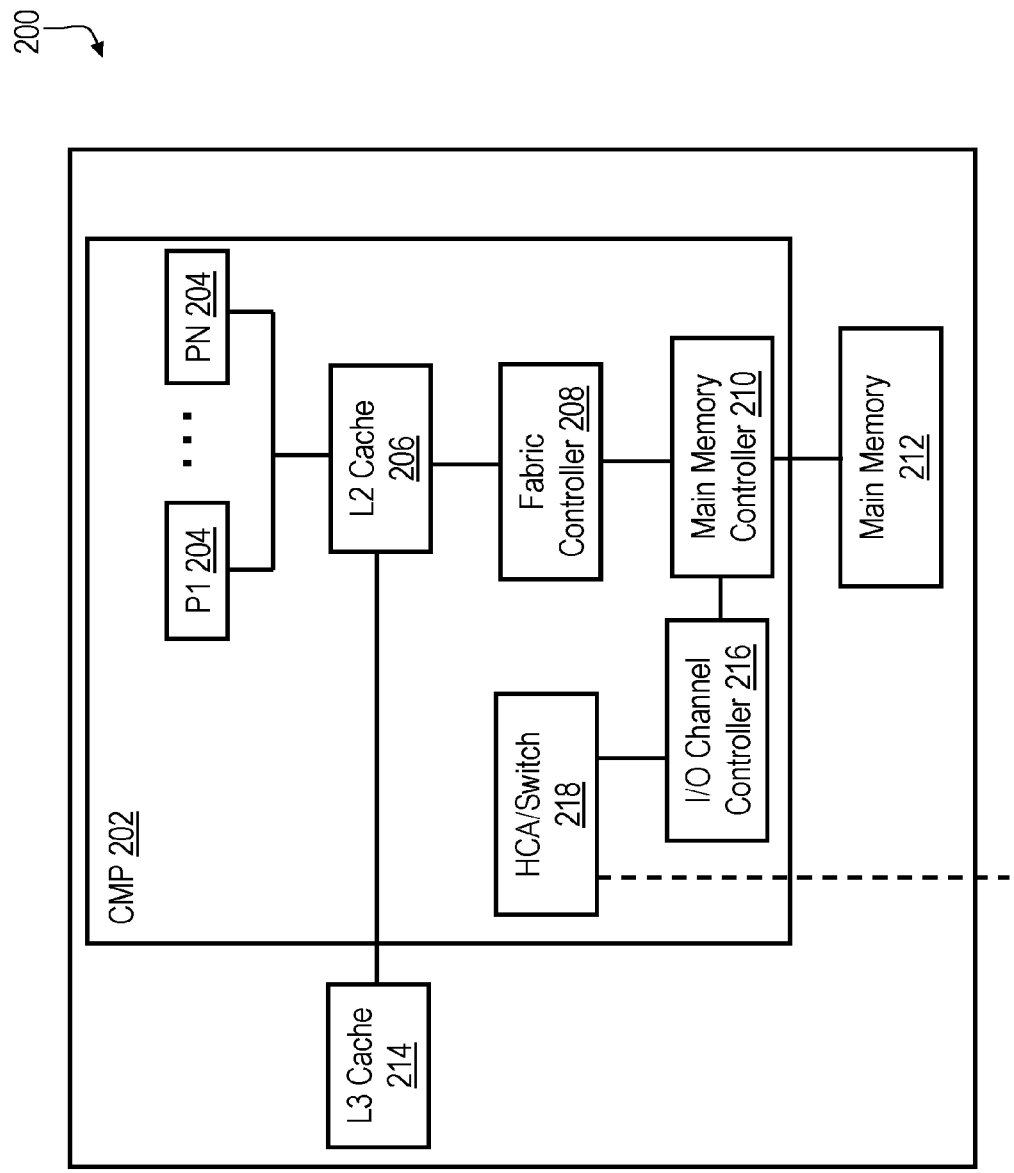
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
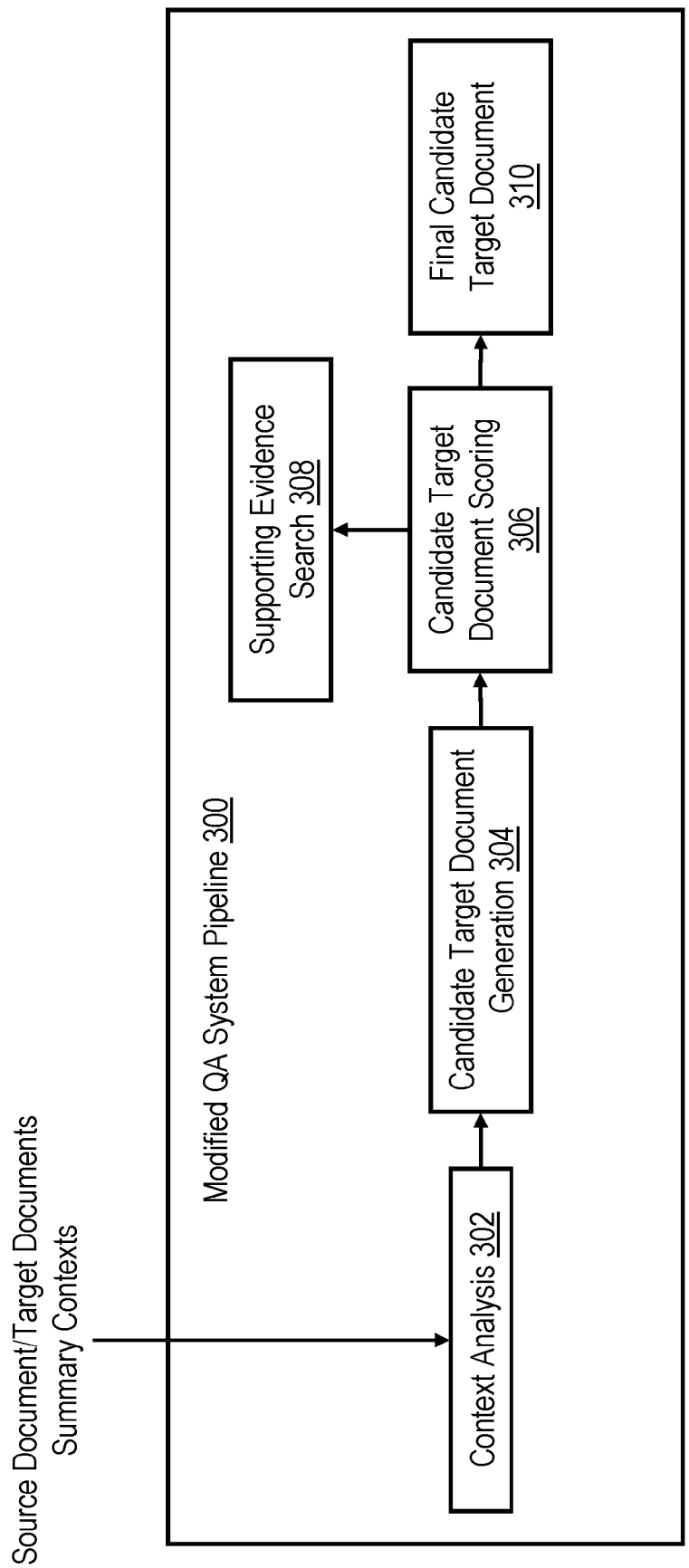
FIG. 3 depicts relevant components of an exemplary data processing system pipeline in the form of a modified question answering (QA) system pipeline.

FIG. 3 illustrates relevant components of a modified QA system pipeline for an exemplary modified QA system. As is illustrated in FIG. 3, a context analysis block 302 of modified QA system pipeline 300 receives source and target documents summary contexts as inputs and generates outputs representing its analysis of the contexts. A candidate target document generation block 304 of modified QA system pipeline 300 receives the outputs from context analysis block 302 at an input and generates candidate target documents that may be linked to a source document. The candidate target documents are provided to an input of a candidate target document scoring block 306, which is configured to initiate a supporting evidence search (by supporting evidence search block 308) in order to score the various candidate target documents. The results of the scoring are provided to a final candidate target documents block 310, which is configured to provide a final candidate target document based on the scoring of the candidate target documents. It should be appreciated that blocks 302-310 may be implemented in program code executing on one or more processor cores or may be directly implemented in dedicated hardware (logic).

Figure 4:
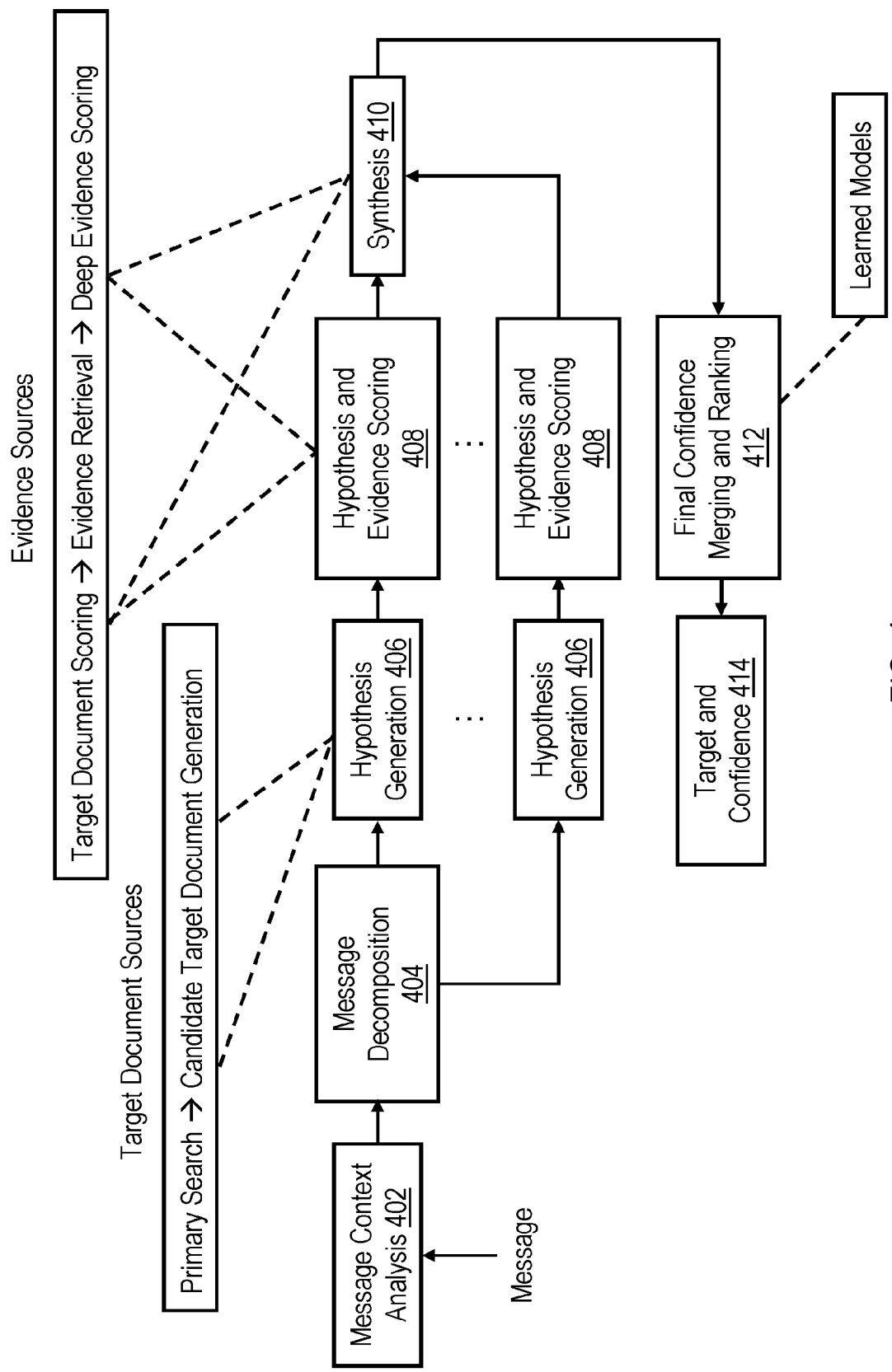
FIG. 4 depicts relevant components of the exemplary modified QA system pipeline of FIG. 3 in additional detail.

FIG. 4 illustrates relevant components of an exemplary modified QA system pipeline in additional detail. As is illustrated, message analysis context block 402 receives a message in a natural language. An output of block 402 is provided to a message decomposition block 404, which further analyzes the different textual, grammatical, linguistic, punctuation and/or other components of the message. Block 404 provides inputs to multiple hypothesis generation blocks 406, which perform parallel hypothesis generation for candidate target documents. Hypothesis generation blocks 406 each perform a primary search, collect reference data from different structured and unstructured sources, and generate candidate target documents. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a modified QA system may be configured, according to the present disclosure, to: receive a message; create 'N' hypotheses (1 . . . N) to find candidate target documents (e.g., N=10); and load data for each hypothesis T on which to operate into a shared cache. For example, assuming a shared cache across all hypotheses, 1/Nth of the shared cache may be loaded with data for each hypothesis to operate on. The modified QA system may be further configured to execute the 'N' hypotheses to return 'M' candidate target documents (in this case, each hypothesis generates one or more candidate target documents). For example, the notation 'ANS_i' may be employed to denote a set of candidate target documents generated by hypothesis 'i'. In various embodiments, hypothesis and evidence scoring for each hypothesis is initiated in hypothesis and evidence scoring blocks 408. That is, the modified QA system is further configured to score all the candidate target documents using hypothesis and evidence scoring techniques (e.g., providing 'M' scores for 'M' candidate target documents). In synthesis block 410 the modified QA system evaluates the candidate target documents with the highest scores and determines which hypotheses generated the highest scores.

Following block 410, the modified QA system initiates final confidence merging and ranking in block 412. Finally, in block 414, the modified QA system provides a single target document (and may provide a confidence score) for the message. Assuming, for example, the candidate target documents 'j', 'k', and 'l' have the highest scores, a determination may then be made as to which of the hypotheses generated the best candidate target documents. As one example, assume that hypotheses 'c' and 'd' generated the best candidate target documents 'j', 'k', and 'l'. The modified QA system may then upload additional data required by hypotheses 'c' and 'd' into the cache and unload data used by other hypotheses from the cache. According to the present disclosure, the priority of what data is uploaded is relative to candidate target documents scores (as such, hypotheses producing lower scores have less associated data in cache). When a new message is received, the above-described process is repeated. If the hypotheses 'c' and 'd' again produce best candidate target documents, the modified QA system loads more data that is relevant to the hypotheses 'c' and 'd' into the cache and unloads other data.

If, on the other hand, hypotheses 'h' and 'g' produce the best candidate target documents for the new message, the modified QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that scoring indicates is most useful. The disclosed process may be unique to a modified QA system when a cache controller is coupled directly to a scoring mechanism of the modified QA system.

According to aspects of the present disclosure, users of data processing systems frequently receive instructions (action commands) to navigate to a particular resource and fill-out forms. In general, such instructions have included specific directions on how to fill-in specific input fields of a target form. In many cases the directions are non-obvious and a user may need to toggle back-and-forth between the directions and the form the user is attempting to fill-in. It would be desirable to provide a user with an easier way to respond to such instructions, such that the user can accomplish a given task while minimizing copy errors and reducing task execution time.

According to one or more embodiments of the present disclosure, a natural language message is parsed to determine an applicable form. For example, an applicable form may be constructed in a programming language, e.g., JavaScript or hyper text markup language (HTML). Information from the message is then retrieved to pre-fill fields of the applicable form. For example, candidate target forms may be located in a manner, as described above, and a determination of whether a candidate target form (candidate form) is the best form can be achieved by comparing input fields in the form to information set forth in the message. When probable matches are found between input fields of a candidate form and information in the message, the form can be pre-filled with relevant values from the message.

As one example, assume a user receives an email message with an action command (instruction). For example, an email message may state, "When you return from the client site, use your department code '7G' and account ID '4XT7' to submit your expense report." According to aspects of the present disclosure, the email message is parsed to make a determination that the user has been instructed to fill-out an expense report, at which point an appropriate expense reporting form (e.g., a web form) may be selected. According to various embodiments, candidate expense reporting forms are accessed and input field names of the candidate expense reporting forms are parsed to determine which of the candidate expense reporting forms is the best expense reporting form. In the above example, a parser may locate the term 'Department Accounting Code' in a selected form, map the term 'Department Accounting Code' in the selected form to the term 'department code' in the email message, and pre-fill the 'Department Accounting Code' entry in the selected form with the value '7G' (retrieved from the email message). Similarly, a parser may locate the term 'Accounting Identification Number' in the selected form, map the term 'Accounting Identification Number' in the selected form to the term 'account ID' in the email message, and pre-fill the 'Accounting Identification Number' entry in the selected form with the value '4XT7' (retrieved from the email message).

As one example, when a user receives an email message with an instruction, the user may initiate automatic form selection and form pre-filling by activating a button associated with an email application. Alternatively, automatic form selection and form pre-filling may be initiated when the user opens an email. As another example, a message that includes an instruction for a user may be generated when the user visits a particular web page. In this case, automatic form selection may be initiated based on the user accessing the web page and portions of the text within the message that are associated with the instruction may be utilized for form pre-filling. For example, text surrounding an action command (e.g., a verb, such as 'submit') may be searched for name-value pairs that are extracted from the message to provide data to accomplish the action command.

In various embodiments, a modified QA system may generate a list of candidate forms that may be utilized to accomplish an action command ('submit your expense report', 'submit your time report', etc.). In this case, the modified QA system may perform candidate scoring by determining whether input fields in each of the candidate forms is supported by the message. For example, input field names and associated input field types (e.g., integer number, real number, or string) may be determined for each candidate form. A message with an action command may then be searched for keyword matches and/or surface form matches to the input field names. The message may also be searched for element type (e.g., integer number, real number, string, lexical answer type (LAT)) matches to the input field types.

In at least one embodiment, when scoring candidate forms, the modified QA system selects a candidate form with the highest score (e.g., candidate forms that match the most input fields) for pre-filling. In general, for each input field name in the selected candidate (target) form, the modified QA system attempts to find a match in the text of the message. For each input field type in the target form that matches an element type in text of the message, the input field is filled in with associated information from the message. In one or more embodiments, evidence is displayed within the message showing the text fragment that suggested a given form input field be filled in with a given value.

Figure 5:
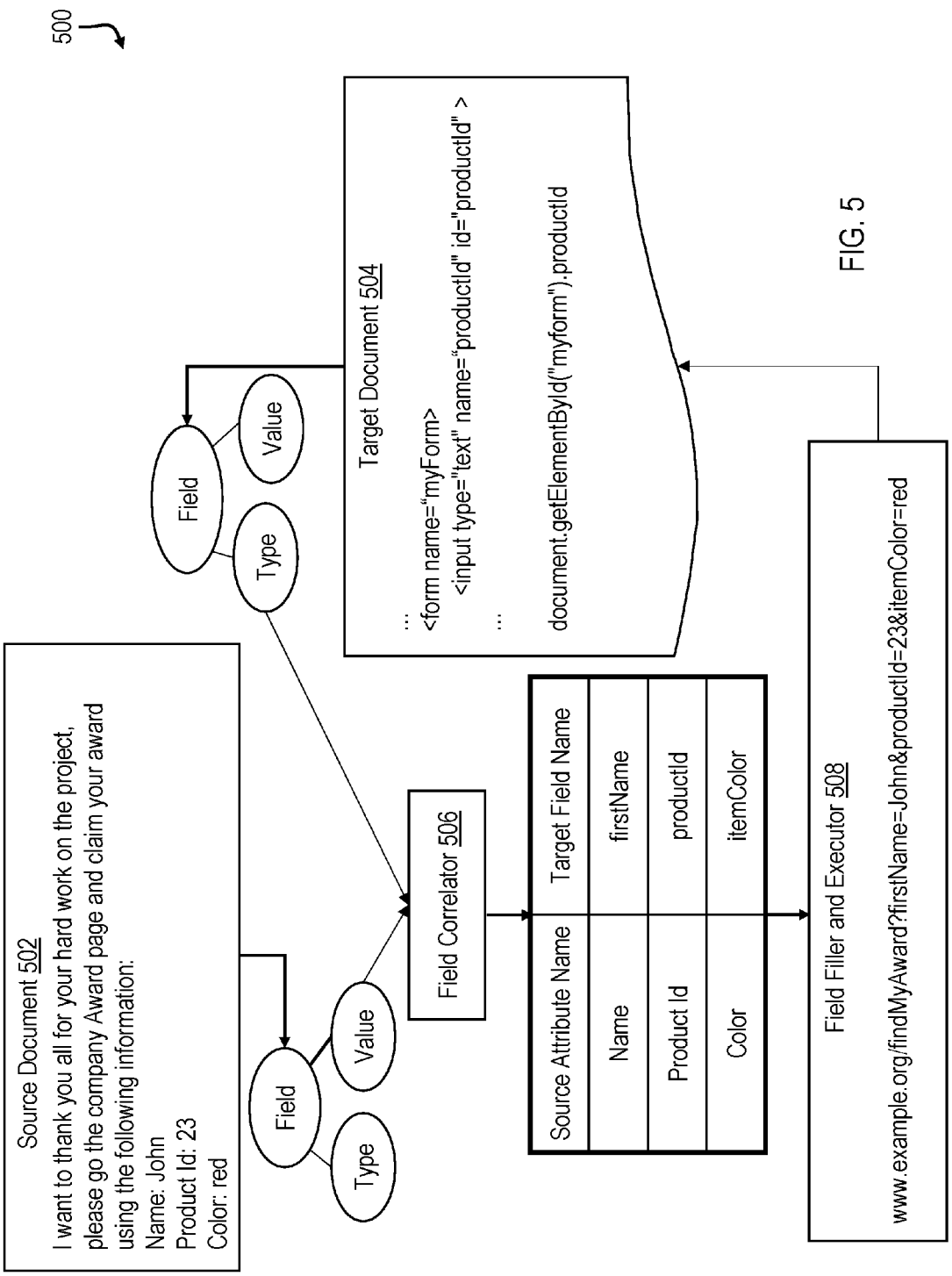
FIG. 5 is a diagram illustrating use of an exemplary field correlator and field filler and executor to pre-fill one or more input fields of an appropriate form.

With reference to FIG. 5, an exemplary diagram 500 illustrates that input field types and input field values from a source document 502 and a target document 504 are provided to a field correlator 506 for correlation. Field correlator 506 may, for example, be implemented within evidence scoring blocks 408 of the QA pipeline illustrated in FIG. 4. For example, source document 502 may include the following content:

I want to thank you all for your hard work on the project, please go the company Award page and claim your award using the following information:
Name: John
Product Id: 23
Color: red Values for input fields that are correlated (by correlator 506) are provided from source document 502 to field filler and executor 508, which pre-fills the received values in appropriate input fields of the source code of target document 504. For example, field filler and executor 508 may be implemented within block 414 of the QA pipeline illustrated in FIG. 4. In various embodiments, target document 504 is a computing device form that may be provided by a stand-alone application executing on a computing device (e.g., a computer system or a mobile phone) or a web-based application accessed by a computing device.

According to another embodiment, a logical reasoning system may be employed to determine which data to apply to an input field of a target form. As one example, assume a user receives an email message that states, "Please submit your hours in ILC. If you are working on Project X, use the accounting code ABC123. If you are not working on Project X, use the accounting code DEF456." Based on a user profile or other supporting data, a determination of what project the user is working on may be ascertained and the ILC form may be populated with an appropriate accounting code. According to yet another embodiment, a cognitive system may be configured to receive voice input from a user, convert the voice input to text, and pre-fill a target form based on NLP of the text.

Figure 6:
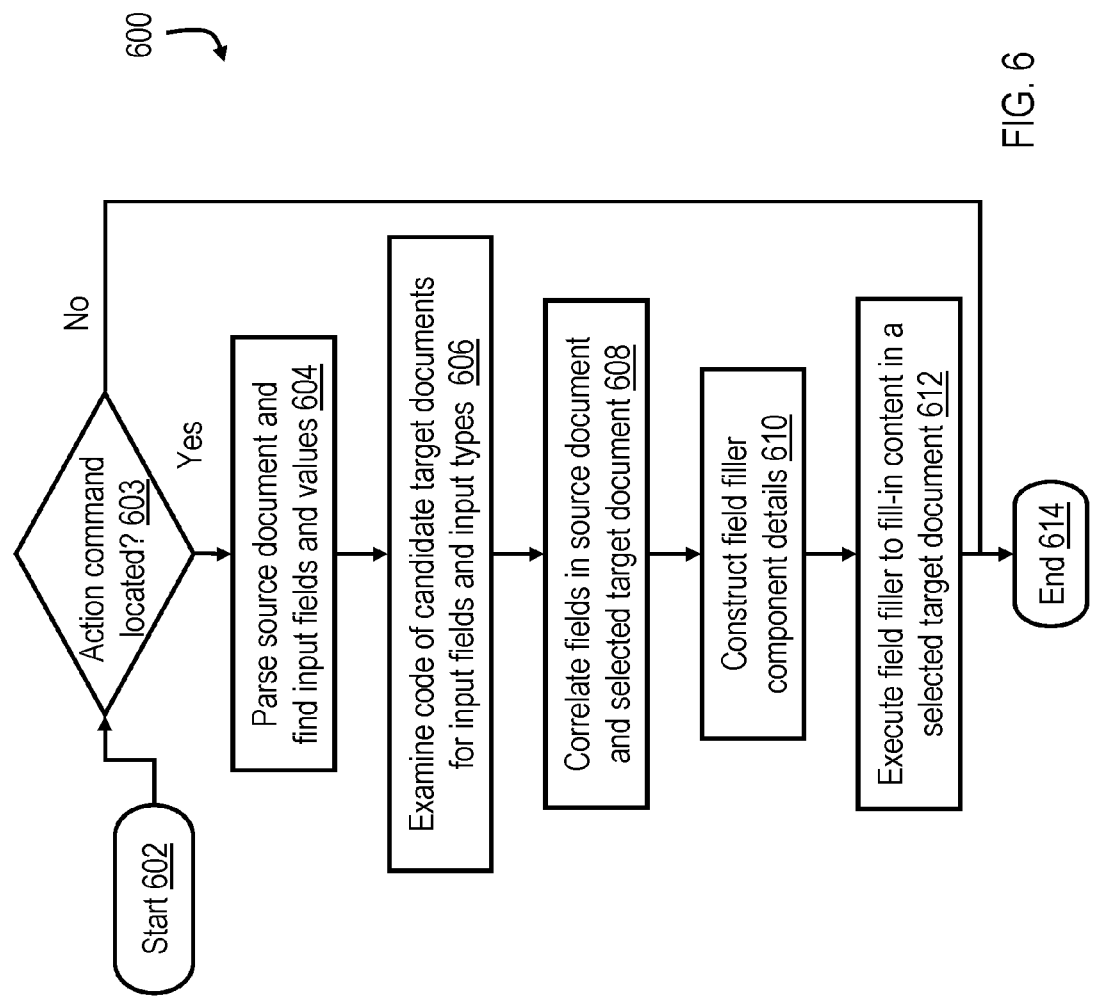
FIG. 6 is a flowchart of an exemplary process for utilizing information associated with an action command in a message to select an appropriate form and populate one or more input fields of the form, according to an embodiment of the present disclosure.

With reference to FIG. 6, a process 600 that is configured to utilize information associated with an action command in a message to select an appropriate form and populate one or more input fields of the form, according to an embodiment of the present disclosure, is illustrated. Process 600 may be, for example, executed by one or more data processing systems 200 that implement a modified QA system, as discussed above. In block 602 process 600 is initiated, e.g., in response to a user selecting a button associated with an email application, by data processing system 200. Then, in block 603 data processing system 200 determines whether an action command is located in the message. In response to an action command not being located in the message, control transfers from block 603 to block 614, where process 600 terminates. In response to an action command being located in the message, control transfers from block 603 to block 604. In block 604, data processing system 200 parses a source document 502 and finds potential input fields and potential values for the input fields in source document 502.

Then, in block 606, data processing system 200 examines source code of candidate target documents 504 for the potential input fields found in source document 502 and input types that agree with the potential values found in source document 502. In the event that multiple candidate target documents are found, data processing system 200 ranks the candidate target documents and selects one of the candidate target documents with the highest rank. Next, in block 608, data processing system 200 correlates input fields in source document 502 and selected target document 504. Then, in block 610, data processing system 200 constructs input field filler component details. Next, in block 612, data processing system 200 executes field filler and executor 508 to fill-in content in selected target document 504. Following block 612, process 600 terminates in block 614.

Accordingly, techniques have been disclosed herein that advantageously utilize information associated with an action command in a message to select an appropriate form and fill-in (populate) one or more input fields of the form.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of pre-filling a computing device form with information associated with an action command found in a message, comprising:
    receiving, by a form filling system, a message;
    analyzing, by the form filling system, content of the message utilizing natural language processing (NLP) to locate an action command within the message;
    applying, by the form filling system, NLP to text associated with the action command to determine a context of the action command;
    selecting multiple candidate forms based on the multiple candidate forms being preconfigured to allow completion of the action command;
    applying, by the form filling system, a similarity algorithm to the text associated with the action command and one or more input fields of the multiple candidate forms to identify one or more matching elements between the text and the input fields of the forms;
    selecting a form from among the multiple candidate forms, by the form filling system, based on which of the multiple candidate forms has a greatest number of the matching elements between the text and the input fields of the form; and
    automatically pre-filling, by the form filling system, the input fields in the form with information associated with the matching elements in the message whose similarity exceeds a predetermined threshold without user interaction to minimize copy errors and reduce task execution time associated with filling in the form.

2. The method of claim 1, wherein the selecting the form further comprises:
    selecting the form, from among multiple candidate forms, based on which of the multiple candidate forms also has a greatest number of types of the information matching types utilized in the input fields of the form.

3. The method of claim 1, wherein the form is constructed in a programming language.

4. The method of claim 3, wherein the programming language is hyper text markup language (HTML).

5. The method of claim 3, wherein the applying, by the form filling system, a similarity algorithm further comprises:
    parsing the programming language to identify the input fields of the form;
    mapping the matching elements to the input fields of the form; and
    pre-filling the input fields of the form with the information associated with the matching elements in the message.

6. The method of claim 1, wherein the message is one of a text message, an email message, a message included in a word processing document, and a message generated by a web page.

* * * * *